US005174985A

United States Patent [19]

Schwarz et al.

[11] Patent Number: 5,174,985

[45] Date of Patent: Dec. 29, 1992

[54] PROCESS FOR THE OXIDATION OF WATER-INSOLUBLE ORGANIC COMPOUNDS

[75] Inventors: Hans-Helmut Schwarz, Krefeld; Friedhelm Sahlmen, Moers; Otto Immel; Hanno Henkel, both of Krefeld, all of Fed. Rep. of Germany

[73] Assignee: Bayer Aktiengesellschaft, Leverkusen, Fed. Rep. of Germany

[21] Appl. No.: 642,105

[22] Filed: Jan. 16, 1991

[30] Foreign Application Priority Data

Jan. 23, 1990 [DE] Fed. Rep. of Germany ....... 4001782

[51] Int. Cl.[5] .......................... C01B 7/00; A62D 3/00

[52] U.S. Cl. .................................... 423/659; 423/399; 588/205; 588/207; 588/248

[58] Field of Search ............... 423/399, DIG. 20, 659; 210/903; 588/203, 205, 207, 248

[56] References Cited

U.S. PATENT DOCUMENTS 4,497,782 2/1985 Howell et al. ...................... 423/184
4,995,916 2/1991 Meikrantz et al. ............... 134/22.16
5,019,175 5/1991 Rogers et al. ......................... 134/42

FOREIGN PATENT DOCUMENTS 1375259 11/1974 United Kingdom .

*Primary Examiner*—Gary P. Straub
*Assistant Examiner*—Timothy C. Vanoy
*Attorney, Agent, or Firm*—Sprung Horn Kramer & Woods

[57] ABSTRACT

Water-insoluble chlorinated hydrocarbons can be largely degraded by mixing with nitric acid and heating to temperatures of 150° C. to 350° C. under pressures of 6 bar to 350 bar.

4 Claims, No Drawings

PROCESS FOR THE OXIDATION OF WATER-INSOLUBLE ORGANIC COMPOUNDS

This invention relates to a process for the oxidation of organic pollutants which, in addition to carbon, hydrogen and oxygen, also contain other elements in bound form. The process according to the invention is based on oxidation with nitric acid at temperatures in the range from 150° C. to 350° C. and under pressures of 6 bar to 350 bar.

The disposal of organic waste materials often presents considerable difficulties, particularly when such elements as halogens, sulfur, phosphorus and the like are present. In cases where incineration is used for disposal, as is often the case, the degradation products of these elements have to be washed out with considerable effort from the combustion gases formed. Particular difficulties arise when the incineration process results in the formation of chlorinated benzodioxins and dibenzofurans and these compounds have to be almost completely removed.

Major problems arise in the detoxification of polychlorinated biphenyls and dibenzodioxins for the degradation of which a number of processes—generally complicated and expensive—have been developed. Examples of such processes include high-temperature incineration (Kokoszka, I., and Kuntz, G.: Methods of PCB Disposal, PCB Seminar, Sep. 20, 1983, Netherlands Ministry of Housing and Environment), in which particular measures have to taken to give all the gas molecules a sufficient residence time at high temperatures. Photolysis (Esposito, M.P., et al: Dioxins, EPA Report 600-2-80-197, Nov. 1980) has the serious disadvantage that all the molecules to be destroyed must be affected by light. Treatment with sodium (Goodyear Tire and Rubber Co.: A Safe, ETH Chemical Disposal Method for PCB's. Research Lab., Report 1980) or reactions with sodium naphthalenide (Smith, J. G. et al.; J. Chem. Technol. Biotechnol 30 (1080) 620) or with alkali metal polyethylene glycolates (Pytlewski, L. I. et al: Mid. Atl. Waste Conf. (Proc.) 1979, 11, 97 C.A. 94 (1981) 14, 108 583) all involve the problematical handling of metallic sodium. Catalytic processes (Bayers, S. K. et al. Tetrahedron Letters 26, 19 3677) are only economical where long-life catalysts can be developed—a requirement which often cannot be fully satisfied, if at all, particularly when the waste to be treated is contaminated. Radiolytic decomposition (Singh, A, et al: Radiat. Phys. Chem. 24 (1985) 11) and decomposition in supercritical water (Freeman, H. M. and Oletsey, R. A.: J. Air Pollut. Control Assoc. 36 (1986) 11, 1, page 67) are also processes which involve considerable technical problems.

There is still a need for an economical process for the disposal of organic water-insoluble products which contain elements in addition to C, H and O.

It has been found that water-insoluble chlorinated hydrocarbons can be largely degraded by mixing with nitric acid and heating to temperatures of 150° to 350° C. under pressure of 6 bar to 350 bar.

The substances are preferably heated to a temperature of 250° to 310° C. They can then be degraded in a short reaction time although the pressure required to maintain a liquid phase should not be unnecessarily high in that case. The minimum operating pressure is preferably of the order of 30 bar at a temperature of 250° C. and 100 bar at a temperature of 320° C.

The concentration of the nitric acid used for oxidation may vary within wide limits. A 20 to 70% acid is preferably used, although a more concentrated acid may also be used.

The reaction time depends on the temperature, the concentration of nitric acid and the mixing of the components. Of particular significance is the observation that, even in non-stirred autoclave tests, the organic substance could still be degraded with nitric acid, albeit more slowly than with intensive stirring.

To obtain complete degradation of the organic substance, it is best to use an excess of nitric acid. From 2 g $HNO_3$ (100%) per gram organic substance to 40 g/g may be used to degrade the pollutants, quantities of 2.5 to 7 g/g preferably being used.

Using the process according to the invention, organic products may be completely degraded without any new dangerous substances being formed. The ability of the process according to the invention to destroy even the highly stable chlorinated dibenzodioxins and furans is of particular significance.

The process according to the invention may be carried out both continuously and discontinuously.

EXAMPLE 1

In a shaking autoclave of tantalum, 30 g Chlophen and 910 g 20% nitric acid are heated for 2 hours to 280° C. under a pressure of 86 bar. After cooling, a clear aqueous phase remains behind. The oily chlophene phase originally present has completely disappeared. The aqueous phase has a COD value of 2.4 g/l. No chlorinated dibenzo-p-dioxins or dibenzofurans can be detected in the aqueous phase.

EXAMPLE 2

In an autoclave, 60 g Chlophen containing 44.8% by weight organically bound chlorine and 910 g 40% nitric acid are heated for 4 hours to 250° C. under a pressure of 46 bar. A single-phase aqueous solution remains behind from which compounds containing a total of only 0.21 g organically bound halogen can be removed by 5x extraction with toluene. This corresponds to an organic halogen degradation level of 99.2%.

EXAMPLE 3

50 g 1,1-dichloroethane and 685 g 20% nitric acid are heated for 2 hours to 280° C. under a pressure of 94 bar. A clear aqueous phase having a COD content of 1 g/l remains behind after cooling. No dichloroethane can be detected.

EXAMPLE 4

5 g chloranil containing 15 ppm octachlorodibenzo-p-dioxin (OCDD) and 1.2 ppm octachlorodibenzofuran and 910 g 20% nitric acid were heated for 4 hours to 280° C. under a pressure of 106 bar. A single aqueous phase remained behind in which neither chloranil nor any polychlorinated dibenzo-p-dioxins or polychlorinated dibenzofurans could be detected.

EXAMPLE 5

In a non-stirred autoclave, 30 g chlophene and 960 g 20% nitric acid were heated for 2 hours to 280° C. under a pressure of 111 bar. An aqueous phase having a COD value of 1.4 g/l is all that remains after cooling.

We claim:

1. A process for oxidizing at lest one chlorinated dibenzodioxin or chlorinated dibenzofuran which comprises contacting it with nitric acid at a temperature of 150° to 350° C. under a pressure of 6 to 350 bar.

2. A process according to claim 1, wherein the oxidation is carried out with an excess of 2 g to 40 g of nitric acid per gram of material to be oxidized.

3. A process according to claim 1, wherein the oxidation is carried out with an excess of 2.5 g to 7 g of nitric acid per gram of material to be oxidized.

4. A process according to claim 1, wherein the oxidation is carried out in an autoclave under a pressure of 30 bar to 100 bar.

* * * * *